No. 842,620.  PATENTED JAN. 29, 1907.
J. BROWN.
ROPE FASTENER.
APPLICATION FILED FEB. 3, 1906.
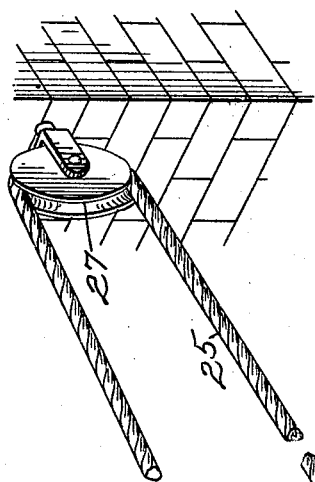
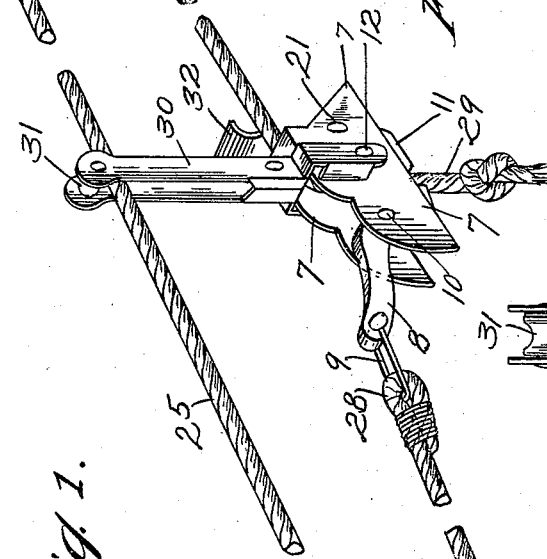
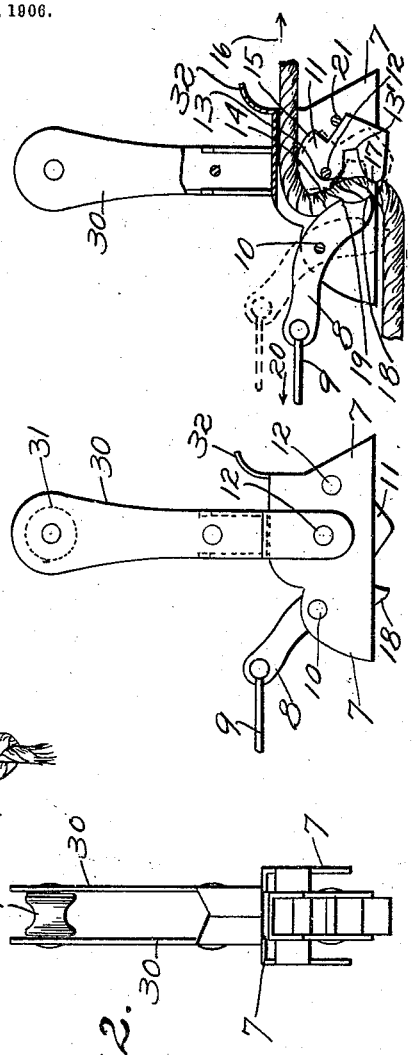
Witnesses:
H. Fleischer,
Robert Adt.
Inventor:
Julius Brown,
By his Attorney,
F. H. Richards.

UNITED STATES PATENT OFFICE.

JULIUS BROWN, OF PEEKSKILL, NEW YORK.

ROPE-FASTENER.

No. 842,620.  Specification of Letters Patent.  Patented Jan. 29, 1907.

Application filed February 3, 1906. Serial No. 299,247.

*To all whom it may concern:*

Be it known that I, JULIUS BROWN, a subject of the Emperor of Germany, residing in Peekskill, in the county of Westchester and State of New York, have invented certain new and useful Improvements in Rope-Fasteners, of which the following is a specification.

This invention relates to an improved device for taking up the slack in ropes and for holding the end of the rope; and an object of the invention is to provide a device for taking up the slack in a rope, particularly such as are used for pulley clothes-lines, and provide means whereby one end of a rope may be drawn through the device and securely held until such time as it is desired to release the rope and put more slack into the main portion of the rope.

The device may also be employed in other positions—such, for instance, as the halyard of a flag or the brace for a sail.

The invention also includes means whereby the pulley clothes-line may be adjusted as to its slackness and also for supporting one of the runs of the rope by the other, so that these do not become separated to too great a distance.

In the drawings accompanying and forming a part of this specification an embodiment of a form of my invention is illustrated, and wherein Figure 1 shows a perspective view of my device applied to a pulley-clothes-line. Fig. 2 is an end view of the device detached. Fig. 3 is a side view thereof; and Fig. 4 is a view similar to Fig. 3, showing the side plate removed and a rope clamped in the device.

The structure is shown as embodying a sheet-metal casing or housing (designated in a general way by 7) and within which the operative parts of the clamping device are securely housed. The clamping mechanism is shown as comprising a pair of members movable toward and from each other for the purpose of clamping and releasing the rope. One of these members is shown in the form of a lever 8, having some suitable means to which a rope may be attached, which is here illustrated in the form of a shackle 9. The lever is represented as fulcrumed upon a pivot in the form of a rivet 10, passing through the lever and through the side plates or housing 7, not only supporting the lever but adding to the rigidity of the housing. The other member of the clamping device is shown in the form of a dog 11, pivoted upon a rivet 12, also passing through the sides of the housing. The dog is shown as having a recess 13 at a point below the rivet and as having a pair of engaging faces 14 and 15 for engaging the rope. These are illustrated above the recess 13. In the present description the words "above" and "below" are arbitrarily used in connection with the present illustration, since the device does not have to be in the position illustrated herein. The upper part of the dog has a face 15, which runs backwardly from the pivotal point 12, and this dog may be regarded as a lever, since the pivot 12 is the fulcrum, the face 15 constitutes the end of the lever to which the power is applied, and the faces 13 and 14 constitute the working end of the lever. By this means when a rope is drawn across the faces 13 and 14 and over the face 15 and in the direction of the arrow 16 the heel 17 of the dog will be moved toward the left-hand side of Fig. 4 and against the rope, pressing it against the face 18, the face 19 of the lever pressing the rope toward the faces 13 and 14—that is, assuming that a rope is attached to the shackle 9 and is being drawn in the direction of the arrow 20.

The throw of the dog in both directions may be controlled by means of a suitable stop-pin, which is shown in the nature of a rivet 21.

A mode of applying the device in practice is illustrated in Fig. 1, wherein a pulley clothes-line 25 is shown passing over pulleys 26 and 27, one of these being shown supported by a hook and the other by a wall. One end of the rope, as 28, is shown as fastened to the shackle, and the other end 29 is shown passing over the faces 15 and 14 13 and the heel 17, and the slack of the rope will be taken up by drawing the end of the rope in a downward direction in the present illustration. The rope will freely pass over the various faces, the pressure downward upon the heel of the dog 17 and the face 18 of the lever will throw the members apart, and upon reverse movement the clamping members will move toward each other and securely hold the rope.

The housing of the device is shown as carrying a pair of upwardly-projecting limbs 30 and supported between these is a sheave 31. The upper run of the rope is shown passed under this sheave, so that the weight of the attachment will be equally distributed between the two runs of the rope and also for the purpose of holding the runs from being separated to any great distance when considerable weight is placed upon one of these and there is no weight upon the other.

It is frequently desirable to unfasten the rope or release the slack by the use of one hand only and for which purpose there is shown a grip member 32, carried by the housing. When it is now desired to release the rope and to permit the same to become slack, the fingers will be placed upon the end of the housing and engage the grip 32 and the thumb engage the lever 8 and draw the same up, and then a downward movement of the hand holding the parts in the dotted-line position illustrated in Fig. 4 will permit the rope to pass between the members in the direction of the arrow 16, releasing the lever 8, the clamping will automatically take place.

The lever 8 is caused to properly perform its function when it is suitably anchored or held from movement relative to the tendency of movement of the end of the rope in the direction of the arrow 16, and this anchoring may be brought about by attachment to the end of the rope which is being controlled by the device or some other anchoring or fastening device, as will be apparent.

Although I have illustrated my invention herein in but one form and have shown the same as applied to a pulley-clothes-line-tightening device, yet it will be apparent that without departing from the spirit of my invention the device may be so clothed within the scope of the appended claims that it will meet various requirements to which it is adaptable.

Having described my invention, I claim—

1. In a device of the character specified, the combination with a housing or support, of a pair of rope-clamping members pivoted therein, one of these having means for attachment to a rope, and having engaging faces for a rope passing through the device, and the other constituting a pivoted member having a face for engaging the rope and swinging the member upon its pivot toward the other member, said pivoted member having faces for the engagement of a rope pressed toward it by a face of said first member, and having a heel for pressing the rope at another point against another face of said first-mentioned member.

2. In a device of the character specified, the combination with a housing, of a lever pivoted therein and having means for the attachment of a rope, and said lever having a pair of spaced-apart rope-engaging faces, a member pivoted adjacent to said lever and having a heel for engaging a rope passing over the other of said faces said member having a recess in its face between said heel and the pivot thereof and a face for receiving the pressure of the rope and moving said heel toward said lever, and means for limiting the movement of said member.

JULIUS BROWN.

Witnesses:
 FRED. J. DOLE,
 CHAS. LYON RUSSELL.